(12) United States Patent
Staley

(10) Patent No.: US 9,926,995 B2
(45) Date of Patent: Mar. 27, 2018

(54) SPRING LOADED HYDRAULICALLY DAMPED STRUT

(71) Applicant: GM GLOBAL TECHNOLOGY OPERATIONS LLC, Detroit, MI (US)

(72) Inventor: Eric D. Staley, Flushing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 99 days.

(21) Appl. No.: 14/806,791

(22) Filed: Jul. 23, 2015

(65) Prior Publication Data

US 2016/0223046 A1 Aug. 4, 2016

Related U.S. Application Data

(60) Provisional application No. 62/109,306, filed on Jan. 29, 2015.

(51) Int. Cl.
| | |
|---|---|
| *F16F 9/516* | (2006.01) |
| *F16F 9/348* | (2006.01) |
| *F16F 9/18* | (2006.01) |
| *F16F 9/58* | (2006.01) |

(52) U.S. Cl.
CPC ............... *F16F 9/516* (2013.01); *F16F 9/18* (2013.01); *F16F 9/348* (2013.01); *F16F 9/3488* (2013.01); *F16F 9/185* (2013.01); *F16F 9/585* (2013.01)

(58) Field of Classification Search
CPC .... F16F 9/185; F16F 9/187; F16F 9/22; F16F 9/348; F16F 9/516; F16F 9/58; F16F 9/585
See application file for complete search history.

(56) References Cited

U.S. PATENT DOCUMENTS

| | | | | |
|---|---|---|---|---|
| 2,702,099 | A | * 2/1955 | Lautz | F16F 9/185 188/284 |
| 2,874,955 | A | * 2/1959 | Mcintyre | B60G 15/062 267/225 |
| 5,333,708 | A | * 8/1994 | Jensen | F16F 9/516 188/284 |
| 2007/0084687 | A1 | * 4/2007 | Foster | F16F 9/512 188/322.2 |
| 2009/0321203 | A1 | * 12/2009 | Widla | F16F 9/3487 188/322.15 |
| 2010/0044957 | A1 | 2/2010 | Yang | |
| 2014/0318908 | A1 | * 10/2014 | Kazmirski | F16F 9/512 188/280 |

FOREIGN PATENT DOCUMENTS

| | | |
|---|---|---|
| CN | 1656325 A | 8/2005 |
| CN | 102165214 B | 8/2011 |
| CN | 102405344 B | 4/2012 |

* cited by examiner

*Primary Examiner* — Anna M Momper
(74) *Attorney, Agent, or Firm* — Quinn IP Law

(57) ABSTRACT

A strut includes a first end, a second end, a cylinder and a piston, wherein the piston is mechanically coupled to the first end and the cylinder is mechanically coupled to the second end. A fluidic chamber is formed between the cylinder and the piston. A first fluidic passageway fluidly couples the fluidic chamber and a fluidic reservoir, and a second fluidic passageway fluidly couples between the fluidic chamber and the fluidic reservoir. A check valve includes an open-biased moveable valve element coupled to a balance spring, and the valve element interacts with a valve seat to control fluidic flow through the second fluidic passageway. The valve element is responsive to urging of the balance spring.

20 Claims, 3 Drawing Sheets

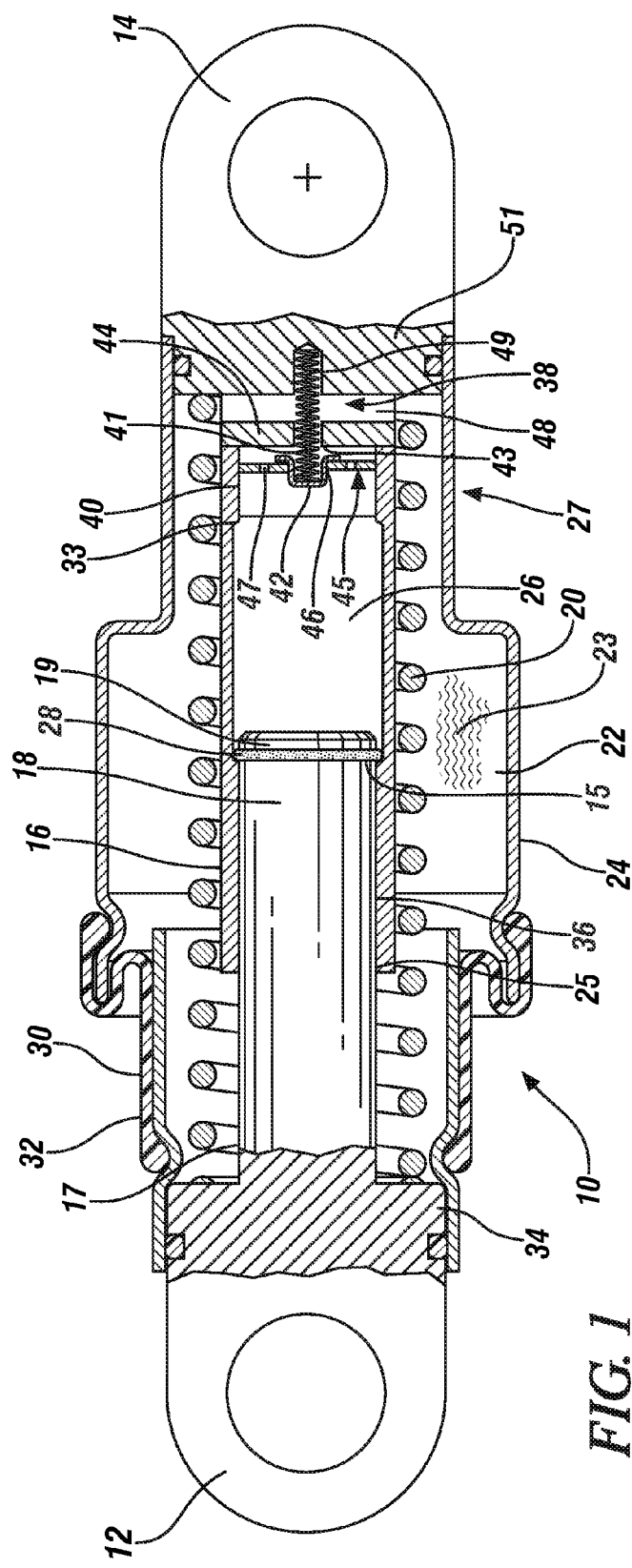
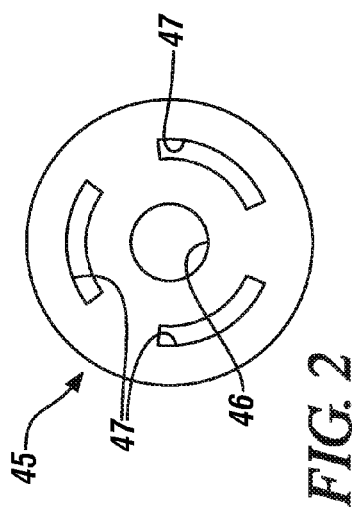

SPRING LOADED HYDRAULICALLY DAMPED STRUT

CROSS-REFERENCE TO RELATED APPLICATIONS

This application claims the benefit of U.S. Provisional Patent Application No. 62/109,306 filed on Jan. 29, 2015, the disclosure of which is hereby incorporated by reference.

TECHNICAL FIELD

This disclosure relates to struts, including spring-loaded hydraulically damped struts.

BACKGROUND

A strut is a structural device arranged between two or more elements that provides structural support therebetween. A strut may include components for vibration damping, and thus be capable of providing vibration-damped structural support between two or more elements. Vibration damping struts may be employed in a vehicle system to provide tension in a serpentine belt assembly for an internal combustion engine, or as a suspension component.

Known vibration damping strut configurations include a moveable piston within a cylinder that span between first and second attaching points to provide vibration-damped structural support. The piston and cylinder form a fluidic chamber that fluidly connects to a reservoir via a normally closed or closed-biased check valve. Normally closed check valves are arranged to prevent flow of fluid from the pressure chamber into the reservoir, such as in response to conditions when the first and second attaching points are moving towards each other. Normally closed check valves are further arranged to permit free flow of fluid from the reservoir into the pressure chamber, such as in response to conditions when the first and second attaching points are moving away from each other. Such strut configurations rely on suction to open the check valve and gravity/pressure to close the check valve. By relying on suction, some strut movement may not lower the chamber pressure sufficiently to open the check valve under some operating conditions when a normally closed check valve is employed. Furthermore, an objectionable audible sound, e.g., a rattle may be generated when movement between the first and second attaching points causes the pressure in the fluidic chamber to dither and drop to pressure levels low enough to create suction and open a normally closed check valve, which can also aerate the fluid when pressures drop below the saturation pressure of the fluid.

SUMMARY

A strut is described, and includes a first end, a second end, a cylinder and a piston, wherein the piston is mechanically coupled to the first end and the cylinder is mechanically coupled to the second end. A fluidic chamber is formed between the cylinder and the piston. A first fluidic passageway fluidly couples the fluidic chamber and a fluidic reservoir, and a second fluidic passageway fluidly couples the fluidic chamber and the fluidic reservoir. A check valve includes an open-biased moveable valve element coupled to a balance spring, and the valve element interacts with a valve seat to control fluidic flow through the second fluidic passageway. The valve element is responsive to urging of the balance spring.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 1 schematically illustrates a cross-sectional view of a passively-activated spring-loaded hydraulically-damped strut including a novel check valve, which is a structural element assembled between two elements that is capable of providing vibration damping, in accordance with the disclosure;

FIG. 2 schematically shows a top view of a flow restrictor plate associated with the check valve, which is a disc-shaped circular element having a circularly-shaped concentric flow-through aperture and a plurality of concentric annular arc-shaped apertures, in accordance with the disclosure;

DETAILED DESCRIPTION

Figure 3:
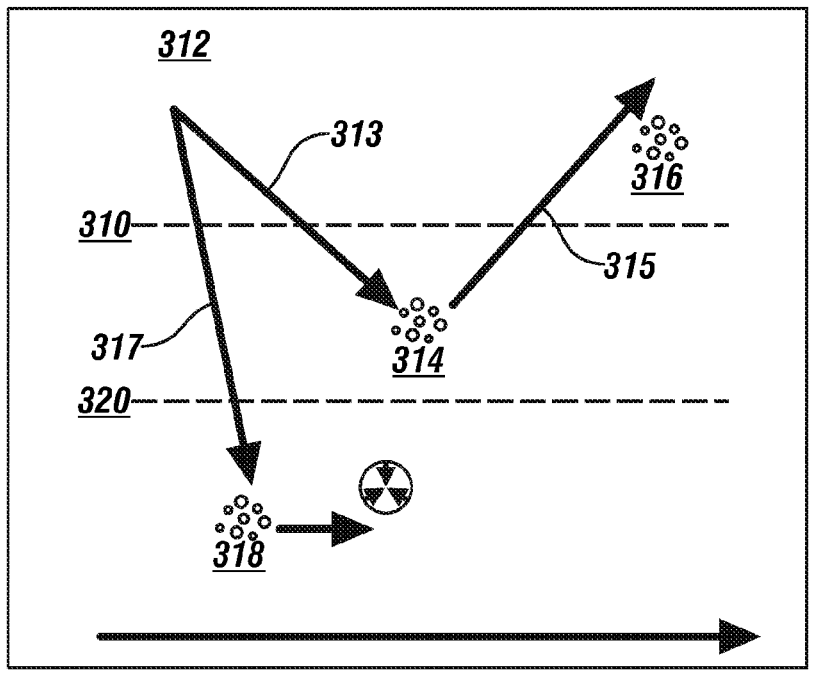
FIG. 3 graphically shows data associated with fluidic pressure within a fluidic chamber of an embodiment of a strut, in accordance with the disclosure.

Referring now to the drawings, wherein the depictions are for the purpose of illustrating certain exemplary embodiments only and not for the purpose of limiting the same, FIG. 1 schematically illustrates a cross-sectional view of a passively-activated spring-loaded hydraulically-damped strut ('strut') 10, which is a structural element assembled between two elements that is capable of providing vibration damping. In one embodiment, the strut 10 may be employed as a tensioner coupled to a pulley that serves as an idler wheel to apply tensile force to a serpentine belt that is configured to mechanically transfer torque between a crankshaft of an internal combustion engine and engine accessory components.

In one embodiment, the strut 10 includes a cylindrically-shaped piston 18 that inserts into an annular cylinder 16, both which are arranged within a helical coil spring (spring) 20. Alternatively, the piston 18 and cylinder 16 may have other cross-sectional shapes, e.g., square, rectangular, triangular, or other. The strut 10 includes a first eyelet 12 and a second eyelet 14, wherein the first eyelet 12 attaches to an elongation element 34 that attaches to the piston 18, and the second eyelet 14 attaches to a base section 51 that attaches to the cylinder 16. The spring 20 urges separation of the first and second eyelets 12, 14. The first and second eyelets 12, 14 provide mechanical attachment points to two elements for providing vibration damping, with the mechanical attachment points in the form of clevises or other suitable attachments. As such, the first eyelet 12 may mechanically couple to a first of the two elements and the second eyelet 14 may mechanically couple to a second of the two elements to provide structural support and vibration damping therebetween.

The piston 18 and cylinder 16 form a fluidic chamber 26 between a second end 27 of the cylinder 16 and a second end 19 of the piston 18. A first end 17 of the piston 18 mechanically attaches to the elongation element 34 that attaches to the first attachment point, e.g., the first eyelet 12. A spring ring 28 assembles onto the second end 19 of the piston 18 and acts to stop travel of the piston 18 within the cylinder 16. The spring ring 28 stops at a maximum expansion travel point of the piston 18 within the cylinder 16 by interfering with a first inwardly projecting shoulder 15. The spring ring 28 stops at a maximum compression travel of the piston 18 within the cylinder 16 by interfering with a second inwardly projecting shoulder 33 near the second end 27 of the cylinder 16.

A first housing element 30 is a tubular-shaped element that is fabricated from steel or another rigid material, is placed around the piston 18 and cylinder 16, and sealably couples to the elongation element 34 near the first eyelet 12. A second housing element 24 is a tubular-shaped element that is fabricated from steel or another rigid material, is placed around the piston 18 and cylinder 16, and sealably couples to the base section 51 near the second eyelet 14. An elastomeric tubular seal 32 sealably attaches to the first housing element 30 on a first end and sealably attaches to the second housing element 24 on a second end. A closed fluidic reservoir 22 is formed thereby, and is filled with fluid 23, which is preferably an incompressible fluid.

The second end 27 of the cylinder 16 mechanically attaches to the base section 51 that attaches to the second eyelet 14. The second end 27 of the cylinder 16 includes a transverse bore 48, a longitudinal bore 49 through a first plate 44 and a check valve 40 that is adjacent to and fluidly couples to the fluidic chamber 26 when the check valve 40 is in an open state. A valve seat 43 is formed in the first plate 44 at an end of the longitudinal bore 49 that opens into the fluidic chamber 26 at the second end 27 of the cylinder 16.

The check valve 40 includes a flow restrictor plate 45, moveable valve element 42 and valve spring 41, and is arranged as a normally open valve to permit fluidic flow between the fluidic chamber 26 and the longitudinal bore 49. FIG. 2 schematically shows a top view of the flow restrictor plate 45, which is a disc-shaped circular element having a circularly-shaped concentric flow-through aperture 46 and a plurality of concentric annular arc-shaped apertures 47. The flow-through aperture 46 serves as a first valve seat for the moveable valve element 42 when in an open position associated with the normally open state of the check valve 40. Thus, the check valve 40 is biased in the open state with the moveable valve element 42 in the open position.

The valve spring 41 is a balance spring that is preferably configured as a helical coil spring that is arranged between the moveable valve element 42 and a distal end of the longitudinal bore 49. The valve spring 41 has a spring constant that permits the moveable valve element 42 to follow the pressure in the fluidic chamber 26. A balance spring is an elastic device, fabricated from steel or another suitable elastic material, which provides a restoring force that is proportional to its linear displacement from a stasis point. Known applications of a balance spring include attaching a spring to a balance wheel that oscillates at a resonant frequency as an element of a timepiece, e.g., a mechanical watch. The spring constant of the valve spring 41 permits the moveable valve element 42 to follow the pressure in the fluidic chamber 26 by having a spring constant that is sufficiently low to be overcome by increasing fluidic pressure on the moveable valve element 42 in the fluidic chamber 26 caused by compression of the strut 10, but also sufficiently large to urge the moveable valve element 42 to the open position at chamber pressures greater than atmospheric pressure. Thus, when the strut 10 is subjected to extension, the valve spring 41 urges the check valve 40 open, i.e., urges the moveable valve element 42 to the open position in response to a reduction in pressure in the fluidic chamber 26 without requiring negative pressure, i.e., without requiring a vacuum in the fluidic chamber 26. Likewise, when the strut 10 is subjected to compression, any increase in the fluidic pressure overcomes the valve spring 41 and urges the check valve 40 to the closed position, i.e., urges the moveable valve element 42 to the closed position.

The moveable valve element 42 is open-biased, i.e., is normally open to allow fluid 23 to flow between the fluidic chamber 26 and the longitudinal bore 49 through the arc-shaped apertures 47 under static pressure and when pressure decreases, such as when tensile force is exerted on the first and second eyelets 12, 14. The moveable valve element 42 responsively moves to a closed position against the valve seat 43 to interrupt fluidic flow between the fluidic chamber 26 and the longitudinal bore 49 when pressure in the fluidic chamber 26 increases above a static pressure. Linear movement of the valve element 42 may be on the order of magnitude of less than 1 mm when moving between the open position and the closed position, and may be 0.1 mm in one embodiment. The arc-shaped apertures 47 are sized with appropriate cross-sectional areas and perimeters to permit fluidic flow under these conditions and without interfering with effect of pressure changes on the moveable valve element 42, including without preventing the moveable valve element 42 to responsively move against the valve seat 43 under pressure conditions.

A closed fluidic circuit includes the fluidic reservoir 22, a first fluidic passageway 36, the fluidic chamber 26 and a second fluidic passageway 38 including the check valve 40. The first fluidic passageway 36 is formed in an annular gap 25 between the piston 18 and the cylinder 16. The second fluidic passageway 38 is formed between the fluidic chamber 26 and the fluidic reservoir 22 through the check valve 40 arranged fluidly in parallel with the flow restrictor plate 45. When the check valve 40 is in the open state, it permits fluidic flow between the fluidic chamber 26 and the fluidic reservoir 22 via the second fluidic passageway 38. When the check valve 40 is in the closed state, it interrupts fluidic flow between the fluidic chamber 26 and the fluidic reservoir 22 via the second fluidic passageway 38. Thus, all fluidic flow between the fluidic chamber 26 and the fluidic reservoir 22 occurs through the first fluidic passageway 38.

When the check valve 40 is normally open and is spring-loaded in the open position, it allows flow from the low pressure fluidic reservoir 22 to the fluidic chamber 26 during extension of the strut 10. During compression of the strut 10, fluidic pressure in the fluidic chamber 26 may create a force on the moveable valve element 42 sufficient to overcome the spring force of the valve spring 41 and thus urge the moveable valve element 42 to close against the valve seat 43.

The strut 10 described herein advantageously relies on a consistent high pressure associated with compressive forces to close the check valve 40 rather than an inconsistent low pressure associated with tensile forces to open the check valve 40. Such a configuration may thus result in system noise reduction, strut response time improvement, reduction of aeration of oil due to negative pressures, and ability to achieve bi-directional damping through the closed fluidic circuit when needed.

FIG. 3 graphically shows data associated with fluidic pressure, e.g., fluidic pressure within the fluidic chamber 26 of an embodiment of the strut 10. Magnitude of fluidic pressure is shown on the vertical axis and time is shown on the horizontal axis. Fluidic pressure is initially shown as liquid pressure 312 that is greater than a saturation pressure 310. As fluidic pressure decreases (313) and becomes less than the saturation pressure 310, air that is dissolved in the fluid materializes in the form of bubbles 314. The presence of air greatly lowers the bulk modulus, or stiffness, of the fluid since air is compressible. A subsequent increase in the fluidic pressure (315) causes a partial or total re-dissolution of the air bubbles into the fluid 316. The re-dissolving of the air into the fluid causes a sudden increase in the stiffness of the fluid, which may result in a sudden change of displacement and a corresponding audible knock within the strut 10. A further decrease in fluidic pressure (317) to a pressure 18 that is less than vapor pressure 320 may result in a state change in the fluid to vapor with associated cavitation. Vaporization may not occur in a configuration of the strut 10 due to design characteristics of the fluidic chamber 26 and other factors.

Figure 4:
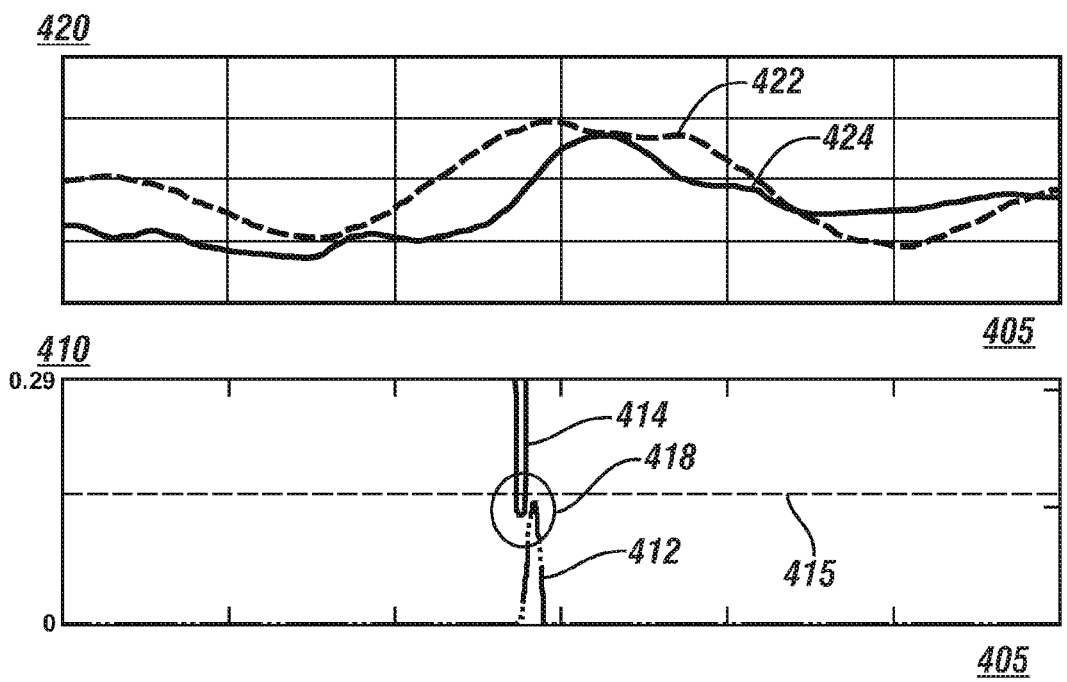
FIG. 4 graphically shows data associated with operating a known strut employing a normally closed check valve showing a single occurrence of a decrease in a fluidic chamber pressure and an associated increase in displacement of a flow control ball of the check valve for the known strut, in accordance with the disclosure.

FIG. 4 graphically shows data associated with operating a known strut that employs a check valve configured in a normally closed state. The upper graph shows a comparison of tensioner strut displacement 420 over an elapsed period of time 405 of 30 ms, including measured data representing longitudinal displacement of the ends of a known strut device 422 and analyzed data 424 that may be input to a system simulator. The lower graph shows pressure 410 of an incompressible fluid contained in a fluidic chamber that is analogous to the fluidic chamber 26 previously described, and a corresponding movement of a ball 412 which is associated with displacement of the ball, disc, or another plugging element of the check valve, wherein such displacement results in fluidic flow through the known check valve in this configuration. A saturation pressure 415 for the fluid is also shown. The results show a single occurrence 418 of a decrease in the chamber pressure 414 associated with an increase in the displacement 412, i.e., extension of the ends of the known strut, with the chamber pressure less than −0.5 bar, which is less than the saturation pressure for the fluid. The associated movement of the ball, i.e., opening of the known check valve from the normally closed state is delayed as it overcomes the forces exerted thereon, and occurs after the chamber pressure is less than the saturation pressure for the fluid. The result is occurrence of an audible knock sound.

Figure 5:
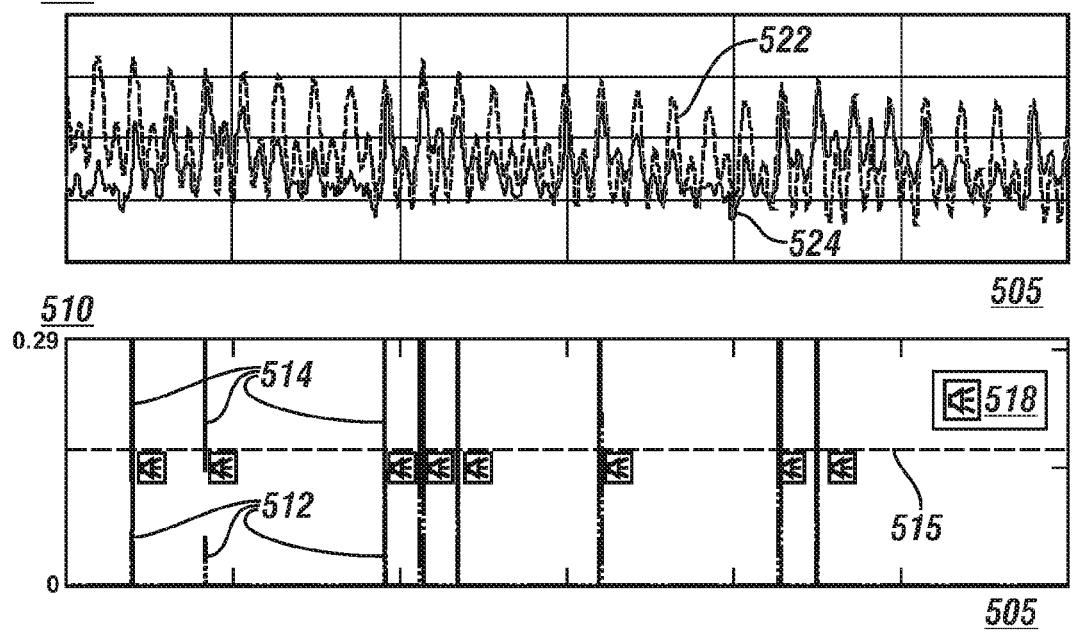
FIG. 5 graphically shows data associated with operating a known strut employing a normally closed check valve showing a plurality of occurrences of a decrease in a fluidic chamber pressure, associated increase in displacement of a flow control ball of the check valve for the known strut and associated audible noise events, in accordance with the disclosure.

FIG. 5 graphically shows data associated with operating a known strut that employs a check valve configured in a normally closed state. The upper graph shows a comparison of tensioner strut displacement 520 over elapsed time shown on the horizontal axis 505, including measured data representing longitudinal displacement of the ends of the known strut device 522 and analyzed data 524 that may be input to a system simulator. The lower graph shows pressure 510 measured in a fluidic chamber 514 that is analogous to the fluidic chamber 26 previously described, and a corresponding movement of a ball 512 that is associated with displacement of the ball, disc, or another plugging element of the check valve, wherein such displacement results in fluidic flow through the known check valve in this configuration. A saturation pressure for the fluid 515 is also shown. The results show a plurality of occurrences 518 that include decrease in the chamber pressure associated with an increase in the displacement, i.e., extension of the ends of the known strut, with the chamber pressure less than −0.5 bar, which is less than the saturation pressure for the fluid. The associated movement of the ball, i.e., opening of the known check valve from the normally closed state is delayed as it overcomes the forces exerted thereon, and occurs after the chamber pressure is less than the saturation pressure for the fluid. Each of the indicated occurrences 518 of decrease in the chamber pressure falling below the saturation pressure resulted in an audible knock sound, which are indicated symbolically.

Figure 6:
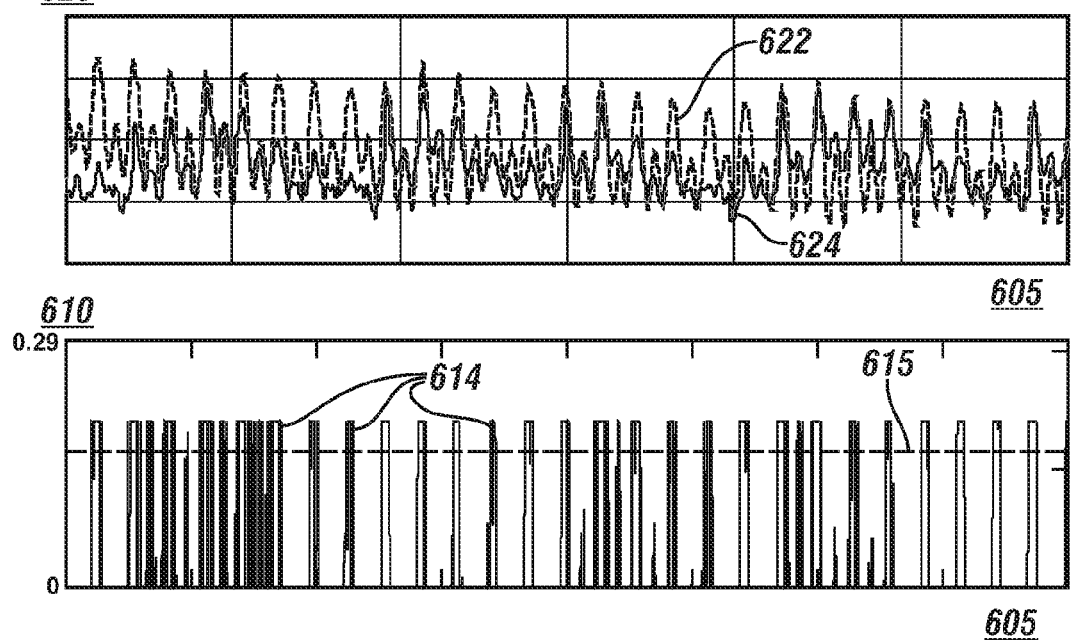
FIG. 6 graphically shows data associated with operating an embodiment of the strut described with reference to FIGS. 1 and 2 that advantageously employs an embodiment of the check valve described herein in a normally open state, in accordance with the disclosure.

FIG. 6 graphically shows data associated with operating an embodiment of the strut 10 described with reference to FIGS. 1 and 2 that employs the check valve 40 configured in the normally open state. The upper graph shows a comparison of tensioner strut displacement 620 over in relation to elapsed time 605, including measured data representing longitudinal displacement of the ends of the strut 10 622 and analyzed data 624 that may be input to a system simulator. The lower graph shows pressure 610 in a fluidic chamber that is analogous to the fluidic chamber 26 previously described, and a corresponding movement of the moveable valve element 42 614 that is associated with displacement of the valve element 42 of the check valve 40, wherein such displacement blocks fluidic flow through the check valve 40 in this configuration. A saturation pressure for the fluid 615 is also shown. The results indicate a complete absence of any occurrence of decrease in the chamber pressure associated with an increase in the displacement, i.e., extension of the ends of the known strut. The associated movement of the valve element 42, i.e., closing of the check valve 40 from the normally open state is also shown. No occurrences of an audible knock sound are indicated.

Potential improvements that may result from implementing the novel passive spring-loaded hydraulically-damped strut 10 described herein include system noise reduction, strut response time improvement, reduction of aeration of oil due to negative pressures. It is further capable of providing bi-directional damping through the closed fluidic circuit.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A strut, comprising:
a first end, a second end, a first spring, a cylinder and a piston, wherein the piston is mechanically coupled to the first end and the cylinder is mechanically coupled to the second end, wherein the piston is disposed to travel within the cylinder between a maximum expansion travel point and a maximum compression travel point, wherein the first spring is in contact with both the first and second ends, and wherein the first spring is disposed to urge separation of the first and second ends towards the maximum expansion travel point;

a fluidic chamber formed between the cylinder and the piston;

a first fluidic passageway fluidly coupling the fluidic chamber and a fluidic reservoir; and a second fluidic passageway fluidly coupling the fluidic chamber and the fluidic reservoir via a valve;

wherein the first and second ends of the strut bound the fluidic reservoir;

wherein the valve includes an open-biased moveable valve element coupled to a balance spring;

wherein the valve element interacts with a valve seat to control fluidic flow through the second fluidic passageway;

wherein the valve element is responsive to urging of the balance spring; and wherein the valve element is disposed in an open state in response to static fluidic pressure in the fluidic chamber.

2. The strut of claim 1, wherein the first fluidic passageway comprises an annular gap formed between the cylinder and the piston.

3. The strut of claim 1, further comprising the valve arranged fluidly in parallel with a flow restrictor plate.

4. The strut of claim 1, wherein the valve including an open-biased spring-actuated valve element comprises:
the valve configured to permit flow between the fluidic chamber and the fluidic reservoir via the second fluidic passageway when in the open state; and
the valve configured to interrupt flow between the fluidic chamber and the fluidic reservoir via the second fluidic passageway when in a closed state.

5. The strut of claim 4, wherein the strut is configured to achieve flow between the fluidic chamber and the fluidic reservoir via the first fluidic passageway when the valve is in the closed state.

6. The strut of claim 1, wherein the balance spring has a spring constant that permits the moveable valve element to follow fluidic pressure in the fluidic chamber.

7. The strut of claim 6, wherein the balance spring having a spring constant that permits the moveable valve element to follow the fluidic pressure in the fluidic chamber comprises the moveable valve element being responsive to urging of the balance spring of the valve, wherein the urging of the balance spring of the valve is overcome by an increase in fluidic pressure on the moveable valve element in the fluidic chamber caused by a compressive effort applied to the first and second ends of the strut.

8. The strut of claim 7, wherein the moveable valve element being responsive to urging of the balance spring of the valve comprises the balance spring of the valve having a spring constant that is overcome by increasing fluidic pressure on the moveable valve element in the fluidic chamber caused by the compressive effort applied to the first and second ends of the strut.

9. The strut of claim 6, wherein the balance spring having a spring constant that permits the moveable valve element to follow the pressure in the fluidic chamber further comprises the spring constant of the balance spring of the valve being sufficiently large to urge the moveable valve element to the open position at chamber pressures greater than atmospheric pressure.

10. The strut of claim 1, wherein the fluidic reservoir, the first fluidic passageway, the second fluidic passageway and the fluidic chamber form a closed fluidic circuit.

11. The strut of claim 1, further comprising a first housing element disposed around the piston and the cylinder and sealably coupled to the first end, a second housing element disposed around the piston and the cylinder and sealably coupled to the second end, and an elastomeric tubular seal sealably attached to the first housing element on a first end and sealably attaches to the second housing element on a second end, wherein the fluidic reservoir is formed therewithin.

12. A strut, comprising:
a first end, a second end, a first spring, a cylinder and a piston, wherein the piston is mechanically coupled to the first end and the cylinder is mechanically coupled to the second end, wherein the piston is disposed to travel within the cylinder between a maximum expansion travel point and a maximum compression travel point, wherein the first spring is in contact with both the first and second ends, and wherein the first spring is disposed to urge separation of the first and second ends towards the maximum expansion travel point;

a fluidic chamber formed between the cylinder and the piston;

a first fluidic passageway fluidly coupling the fluidic chamber and a fluidic reservoir;

a second fluidic passageway fluidly coupling the fluidic chamber and the fluidic reservoir; and an open-biased valve arranged in the second fluidic passageway and including a moveable valve element interacting with a balance spring;

wherein the first and second ends of the strut bound the fluidic reservoir;

wherein the open-biased valve is configured to interact with a valve seat to control fluidic flow through the second fluidic passageway;

wherein the moveable valve element is responsive to urging of the balance spring; and wherein the urging of the balance spring is overcome by an increase in fluidic pressure on the moveable valve element in the fluidic chamber caused by a compressive effort applied to the first and second ends of the strut; and wherein the valve element is disposed in an open state in response to static fluidic pressure in the fluidic chamber.

13. The strut of claim 12, wherein the moveable valve element responsive to urging of the balance spring comprises the balance spring having a spring constant that is overcome by increasing fluidic pressure on the moveable valve element in the fluidic chamber caused by the compressive effort applied to the first and second ends of the strut.

14. The strut of claim 13, wherein the balance spring having a spring constant that permits the valve element to follow the pressure in the fluidic chamber further comprises the spring constant of the balance spring being sufficiently large to urge the moveable valve element to the open position at chamber pressures greater than atmospheric pressure.

15. A passive spring-loaded hydraulically-damped strut assembled between two elements to provide structural support and vibration damping, comprising:
a first end mechanically coupled to a first of the two elements, a second end mechanically coupled to a second of the two elements, a first spring, a cylinder, a piston, and a housing, wherein the piston is mechanically coupled to the first end and the cylinder is mechanically coupled to the second end, wherein the piston is disposed to travel within the cylinder between a maximum expansion travel point and a maximum compression travel point, wherein the first spring is in contact with both the first and second ends, and wherein the first spring is disposed to urge separation of the first and second ends towards the maximum expansion travel point;

a fluidic chamber formed between the cylinder and the piston;

a fluidic reservoir formed between the cylinder and the housing;

a first fluidic passageway fluidly coupling the cylinder and the piston and fluidly coupling the fluidic chamber and the fluidic reservoir;

a second fluidic passageway fluidly coupling the fluidic chamber and the fluidic reservoir, the second fluidic passage including a valve arranged fluidly in parallel with a flow restrictor plate;

the valve including an open-biased spring-actuated valve element including a balance spring;

the valve arranged to permit flow between the fluidic chamber and the fluidic reservoir via the second fluidic passageway when in an open state; and the valve arranged to interrupt flow between the fluidic chamber and the fluidic reservoir via the second fluidic passageway when in a closed state;

wherein the first and second ends of the strut bound the fluidic reservoir;

wherein the balance spring has a spring constant configured to permit the valve element to follow the pressure in the fluidic chamber; and wherein the fluidic reservoir, the first fluidic passageway, the second fluidic passageway and the fluidic chamber form a closed fluidic circuit; and wherein the valve element is disposed in an open state in response to static fluidic pressure in the fluidic chamber.

16. The strut of claim 15, wherein the valve including an open-biased spring-actuated valve element comprises:

the valve element of the valve configured to permit flow between the fluidic chamber and the fluidic reservoir via the second fluidic passageway when in an open state; and the valve element of the valve configured to interrupt flow between the fluidic chamber and the fluidic reservoir via the second fluidic passageway when in a closed state.

17. The strut of claim 16, wherein flow between the fluidic chamber and the fluidic reservoir occurs via the first fluidic passageway when the valve is in the closed state.

18. The strut of claim 15, wherein the balance spring having a spring constant configured to permit the moveable valve element to follow the pressure in the fluidic chamber comprises the moveable valve element being responsive to urging of the balance spring of the valve, wherein the urging of the balance spring of the valve is overcome by an increase in fluidic pressure on the moveable valve element in the fluidic chamber caused by a compressive effort applied to the first and second ends of the strut.

19. The strut of claim 18, wherein the moveable valve element being responsive to urging of the balance spring of the valve comprises the balance spring of the valve having a spring constant configured to be overcome by increasing fluidic pressure on the moveable valve element in the fluidic chamber caused by the compressive effort applied to the first and second ends of the strut.

20. The strut of claim 18, wherein the spring of the valve being a balance spring having a spring constant that permits the moveable valve element to follow the pressure in the fluidic chamber further comprises the spring constant of the balance spring of the valve being sufficiently large to urge the moveable valve element to the open position at chamber pressures greater than atmospheric pressure.

* * * * *